(12) United States Patent
Hu et al.

(10) Patent No.: US 7,028,793 B2
(45) Date of Patent: Apr. 18, 2006

(54) INTERNAL COMBUSTION ENGINES FOR HYBRID POWERTRAIN

(75) Inventors: Haoran Hu, Novi, MI (US); David Merrion, Brighton, MI (US)

(73) Assignee: Green Vision Technology, LLC, Novi, MI (US)

( * ) Notice: Subject to any disclaimer, the term of this patent is extended or adjusted under 35 U.S.C. 154(b) by 0 days.

(21) Appl. No.: 10/360,944

(22) Filed: Feb. 7, 2003

(65) Prior Publication Data
US 2003/0160455 A1    Aug. 28, 2003

Related U.S. Application Data

(60) Provisional application No. 60/355,546, filed on Feb. 8, 2002.

(51) Int. Cl.
*B60K 1/00* (2006.01)
(52) U.S. Cl. .................. 180/65.2; 180/65.4
(58) Field of Classification Search ............... 180/65.1, 180/65.2, 65.3, 65.4, 65.5, 65.6, 65.7, 65.8; 322/39, 40, 9; 123/357, 370, 371, 375; 60/716, 60/717, 719
See application file for complete search history.

(56) References Cited

U.S. PATENT DOCUMENTS

| | | | |
|---|---|---|---|
| 3,791,473 A * | 2/1974 | Rosen ................. | 180/65.2 |
| 4,359,984 A * | 11/1982 | Nakao ................. | 123/357 |
| 4,407,132 A * | 10/1983 | Kawakatsu et al. ........ | 180/65.4 |
| 5,014,511 A * | 5/1991 | Wade et al. ............... | 60/303 |
| 5,327,992 A * | 7/1994 | Boll ..................... | 180/65.2 |
| 5,586,613 A * | 12/1996 | Ehsani ................. | 180/65.2 |
| 5,656,921 A | 8/1997 | Farrall | |
| 5,725,064 A * | 3/1998 | Ibaraki et al. ........... | 180/65.2 |
| 5,789,881 A * | 8/1998 | Egami et al. ............ | 180/65.4 |
| 5,899,828 A * | 5/1999 | Yamazaki et al. ........... | 477/4 |
| 5,943,918 A | 8/1999 | Reed, Jr. et al. | |
| 6,152,853 A * | 11/2000 | Banks, III ............... | 477/186 |
| 6,164,400 A | 12/2000 | Jankovic et al. | |
| 6,233,106 B1 | 5/2001 | Chambers | |
| 6,266,956 B1 | 7/2001 | Suzuki et al. | |
| 6,306,057 B1 * | 10/2001 | Morisawa et al. ........... | 475/5 |
| 6,318,487 B1 | 11/2001 | Yanase et al. | |
| 6,343,473 B1 * | 2/2002 | Kanesaka .................. | 60/609 |
| 6,389,807 B1 * | 5/2002 | Suzuki et al. ............. | 180/65.3 |

* cited by examiner

*Primary Examiner*—Hau Phan
(74) *Attorney, Agent, or Firm*—Harness, Dickey & Pierce, P.L.C.

(57) ABSTRACT

A hybrid powertrain and method for operating same in which the operation of the engine is modified to effect an improvement in the fuel economy and/or emissions performance of the hybrid powertrain. In one embodiment, the battery of the powertrain is employed to provide auxiliary heat to an engine aftertreatment system to thereby improve the effectiveness of the aftertreatment system. In another embodiment, various components of the engine, such as a water pump, are wholly or partly operated by electric motors that receive power from the battery of the powertrain. In another embodiment, engine braking can be employed in situations where regenerative braking does not provide sufficient braking torque. In a further embodiment, the engine valves may be selectively opened to reduce pumping losses associated with the back-driving of the engine.

1 Claim, 13 Drawing Sheets

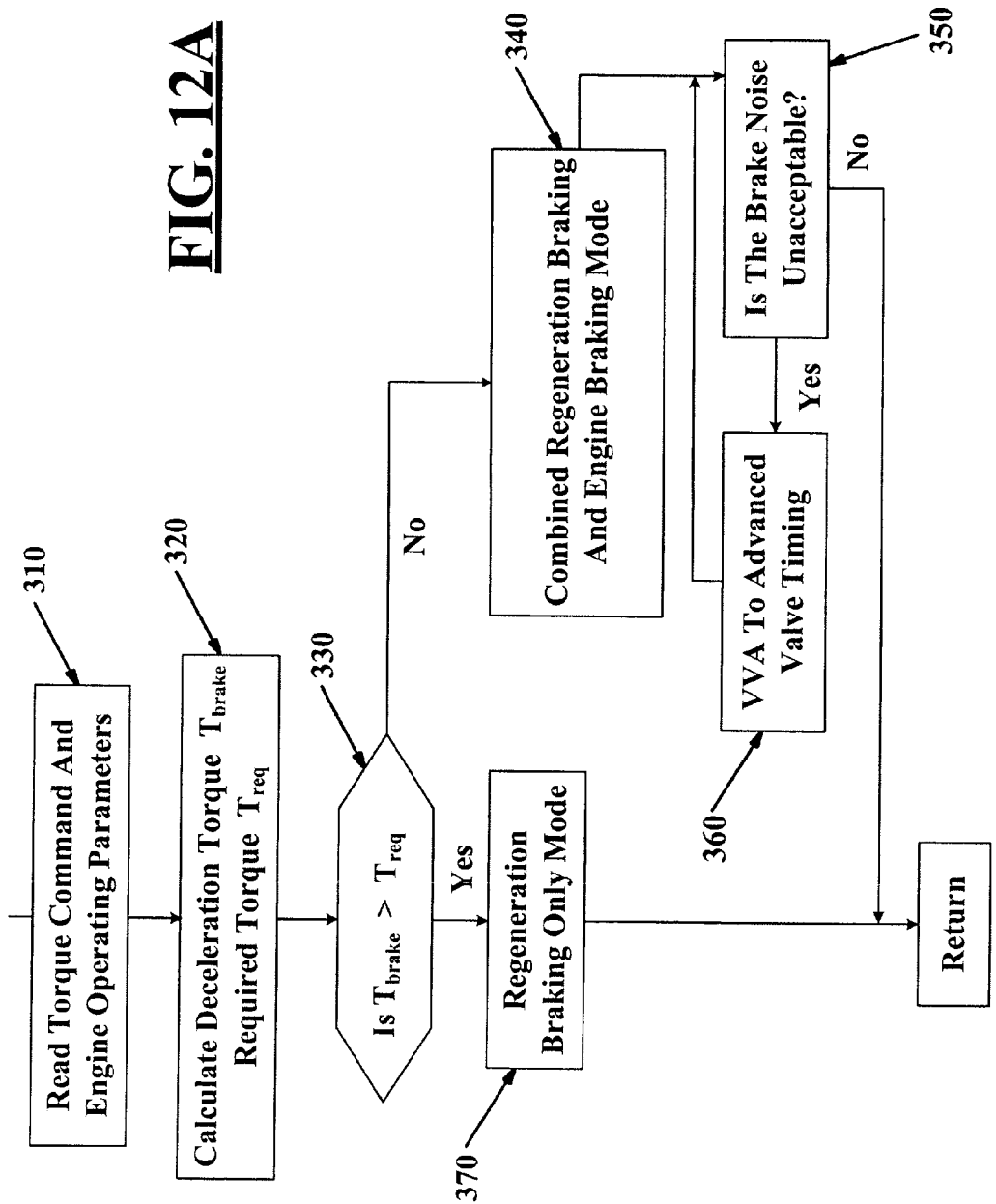

INTERNAL COMBUSTION ENGINES FOR HYBRID POWERTRAIN

CROSS-REFERENCE TO RELATED APPLICATIONS

This application claims the benefit of U.S. Provisional Application No. 60/355,546, filed on Feb. 8, 2002.

FIELD OF THE INVENTION

The invention relates to hybrid powertrains and more specifically to a method for improving fuel economy and/or reducing exhaust emissions in internal combustion engines for use in hybrid powertrains.

BACKGROUND OF THE INVENTION

The recent development of hybrid powertrains in the automotive industry has demonstrated encouraging results for reductions in fuel consumption and exhaust emissions. A vehicle with a hybrid powertrain usually includes an internal combustion engine, an electric generator, an electric motor, a battery and other equipment. In series hybrid vehicles, the generator is driven by the mechanical output of the internal combustion engine. The output of the generator is then combined with the output of the battery to drive the electric motor, such that the mechanical output of the motor drives the vehicle. In contrast, the parallel hybrid vehicle includes an internal combustion engine, a regenerative brake/motor and an electric energy storage device such as a battery and other equipment. PHVs are usually driven directly by the mechanical output of the internal combustion engine. However, when the vehicle must be accelerated or decelerated at a rate that cannot be accomplished by the internal combustion engine alone, or if the drive efficiency of the engine would be degraded if only the internal combustion engine were used, the regenerative brake/motor, which is mechanically connected to the internal combustion engine, operates as an electric motor (on acceleration) or as a regenerative brake (on deceleration) to meet the required rate of acceleration or deceleration through the combined output of the internal combustion engine and the regenerative brake/motor.

The internal combustion engine of a hybrid powertrain has narrow operating range. In series hybrid vehicles, the internal combustion engine is not directly connected to the driving wheels while in parallel hybrid vehicles, the regenerative brake/motor provides rapid acceleration or deceleration. Therefore, the internal combustion engine used in hybrid powertrains can be optimized for better fuel economy and less exhaust emissions relative to powertrains that are solely powered by conventional internal combustion engines.

Examples of hybrid vehicles and their operating modes have been described in detail in several patents. For example, in U.S. Pat. No. 5,656,921, a parallel hybrid vehicle is disclosed having power sources from a SI (spark ignition) engine and an electric motor. It employs fuzzy logic rules to adjust the entries in the tables determining the power splitting between the SI engine and the electric motor. The performance measure used to adjust the entries is given by the weighted ratio between the battery current and fuel flow rate. In U.S. Pat. No. 5,943,918, granted to Reed and U.S. Pat. No. 6,164,400 granted to Jankovic, a hybrid powertrain is described which uses power delivered by both the internal combustion engine and the electric motor. A shifting schedule was developed for a multiple ratio transmission to establishing a proportional relationship between accelerator pedal movement and the torque desired at the wheel. U.S. Pat. No. 6,223,106 granted to Toru Yano et al. and U.S. Pat. No. 6,318,487 granted to Yanase et al. each describe a hybrid vehicle control system operable to prevent the battery from being overcharged during regenerating braking. U.S. Pat. No. 5,725,064, describes a control system operable to open the intake and exhaust valves to reduce the pumping loss when the vehicle is operating in reverse or its electric motor driving mode without using a clutch device to disconnect the internal combustion engine from the transmission. Finally, U.S. Pat. No. 6,266,956 describes an exhaust emission control system for a hybrid car using a separate combustion device to heat the catalyst and to provide hydrocarbons as the reducing agent to the lean NOx catalyst.

The primary focus of the above patents is the drivability of the hybrid vehicle. Unfortunately, little efforts have been applied to the development and integration of the internal combustion engines to optimize the benefits of the hybrid powertrain for lower cost, better fuel economy and lower exhaust emissions, especially, for the heavy-duty diesel engines for the urban and on-highway truck and bus applications.

SUMMARY OF THE INVENTION

The present invention relates to advanced development of internal combustion engines for hybrid powertrain applications and its exhaust emissions controls for urban and on-highway vehicles. The hybrid powertrain includes a diesel engine, a regenerative brake/motor and an electric energy storage device such as a battery. The regenerative brake/motor is capable of operating as both an electric generator as a result of the regenerative braking to decelerate the vehicle and an electric motor. The battery supplies electric energy to and receives electric energy from the regenerative brake/motor. A powertrain controller schedules the driving forces supplied from at least one of the internal combustion engine and the electric motor.

The present invention also features a turbocharged diesel engine with capabilities of multiple fuel injection events and rate shaping, variable valve timing, an exhaust aftertreatment system, engine braking, and battery powered accessories, such as water pump and cooling fan etc.

The electric motor is used to supply supplemental torque to the drivetrain during acceleration and peak torque operating conditions and further acts as the sole power source during low load conditions. The electric motor will also serve as a regenerative brake during the vehicle decelerations. The regenerating brake, in combination with the engine exhaust brake or compression release brake, will provide sufficient retarding power to maintain a proper vehicle speeds on a down slope road. The electricity generated by the regenerating brake will be used to charge the battery.

The powertrain controller schedules fuel delivery to the diesel engine, monitors the battery power, and schedules the battery power delivery to the electric motor. The diesel engine is calibrated so that the combined power of the drivetrain will deliver sufficient power to the wheels and maintain drivability of the vehicle. Since the engine speed can be measured, the desired engine torque is equal to the engine power divided by engine speed Likewise, the desired motor torque is equal to the power desired from the electric motor divided by the electric motor speed. The power at the wheels is approximately equal to the sum of the power delivered from each of the power sources. The desired power at the wheels is the sum of the desired engine power and the desired electric motor power.

This strategy requires a fuel-scheduling map for steady state and transient operations of the diesel engine, as well as the functional relationship maps between the diesel engine and the electric motor. The fuel injection system of the diesel engine has multiple injection event capability such as, for example, pilot injection, main injection, post injection, and rate shaping capabilities, (i.e., triangle, boot, square etc.). The fuel schedule map will specify the injection timing, rate shaping, injection pressure and quantity for best engine fuel economy, emission control, and drivability.

One aspect of the present invention is to power the engine accessories with the battery of the hybrid powertrain. The engine components of diesel engines are typically driven by the crankshaft of the engine, which reduces the power output and fuel economy of the engine. The present invention uses the battery power, which can be generated during the vehicle deceleration, to drive various engine components such as a cooling fan, a water pump, an alternator, an air compressor, a power steering pump and/or an air conditioning compressor.

Another aspect of the present invention is to apply the variable valve timing capability of the diesel engine to reduce the pumping work during the electric motor only mode, to perform cylinder cut-out, and to re-circulate EGR internally by delaying the exhaust valve closing and/or by early intake valve opening to reduce exhaust emissions (variable intake valve closing for increased compression ratio and/or Miller cycle operation).

A further aspect of the invention is to use the battery power to heat the catalytic converter to increase the catalyst efficiency. Efficiency of the after treatment device such as, for example, an NOx absorber and active lean NOx, are temperature dependent. The converter efficiency is decreased during partial load operation and at start up of the engine due to lower exhaust temperature. By externally heating the catalyst through a battery-powered heater, the catalyst maintains at its optimal conversion efficiency to reduce exhaust emissions.

The fourth aspect of the invention is to open the exhaust valve during the compression stroke to perform compression release braking in combination with the regenerative braking of the electric motor to control vehicle speed and to prevent overcharge of the battery.

The fifth aspect of this invention to use motor assisted turbocharger during acceleration to improve the turbo charger responsiveness. The motor is powered the battery of the hybrid powertrain.

Further areas of applicability of the present invention will become apparent from the detailed description provided hereafter. However, it should be understood that the detailed descript and specific examples, while indicating preferred embodiments of the present invention, are intended for purposes of illustration only since various changes and modifications within the fair scope of the present invention will become apparent to those skilled in this art.

BRIEF DESCRIPTION OF THE DRAWINGS

FIG. 12A is a schematic illustration in flow chart form illustrating a method for regenerative brake control performed in accordance with the teachings of the present invention.

DETAILED DESCRIPTION OF THE PREFERRED EMBODIMENTS

Figure 1:
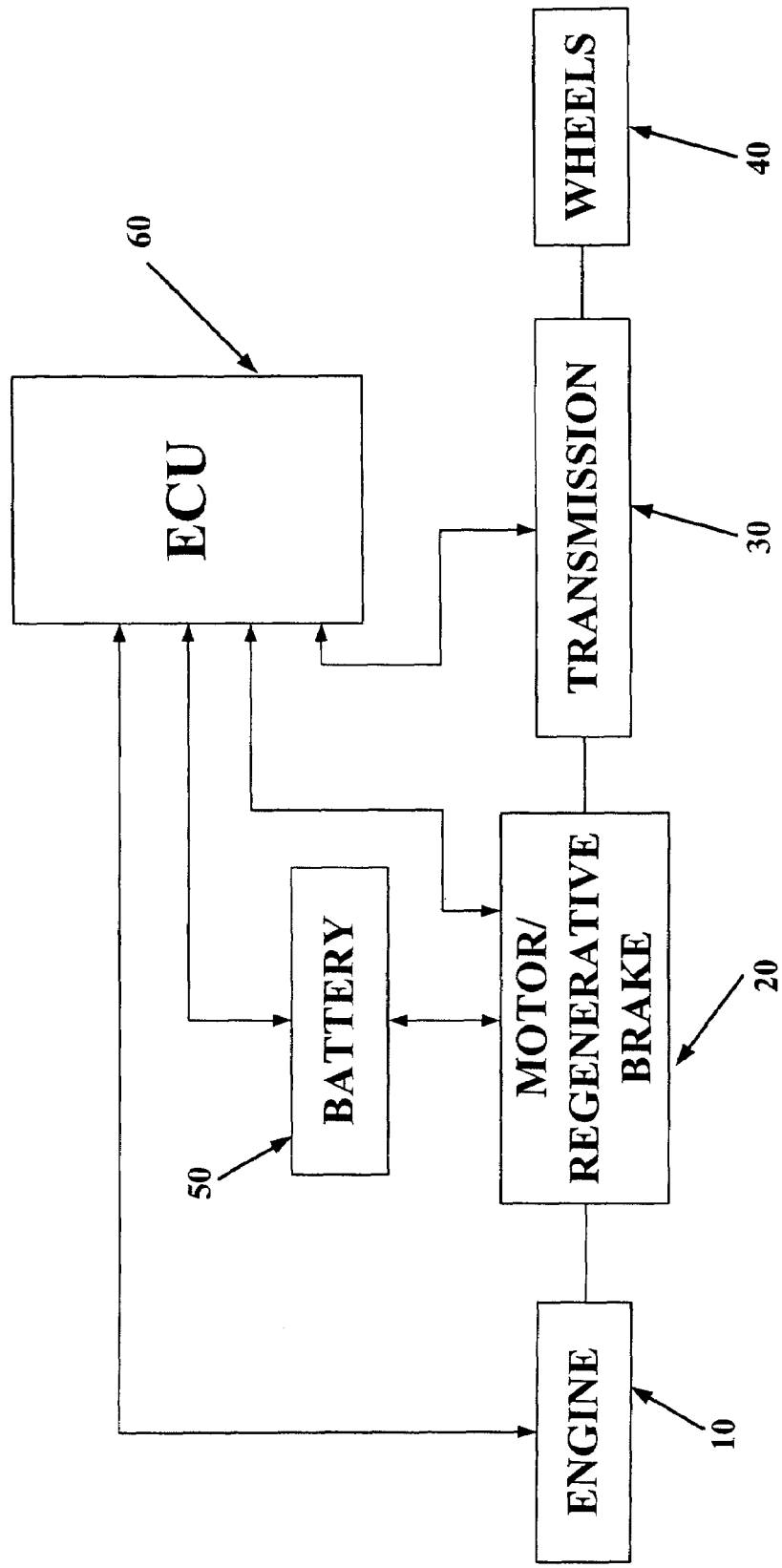
FIG. 1 is a schematic representation of a conventional hybrid vehicle.

A schematic of a conventional serial hybrid powertrain is shown in FIG. 1. The numeral 10 designates a turbocharged diesel engine for use in a vehicle drivetrain. A motor/regenerative brake is shown at 20. Both diesel engine 10 and motor/regenerative brake 20 are connected to a multiple ratio transmission 30. Transmission 30 is mechanically connected to a pair of vehicle driving wheels 40. A battery 50 serves as an energy storage device which is electrically connected to motor/regenerative brake 20. An electronic controller unit 60 is coupled to the engine 10, the motor/regenerative brake 20, the transmission 30 and the battery 50 and controls the overall operation of the drivetrain.

Figure 2:
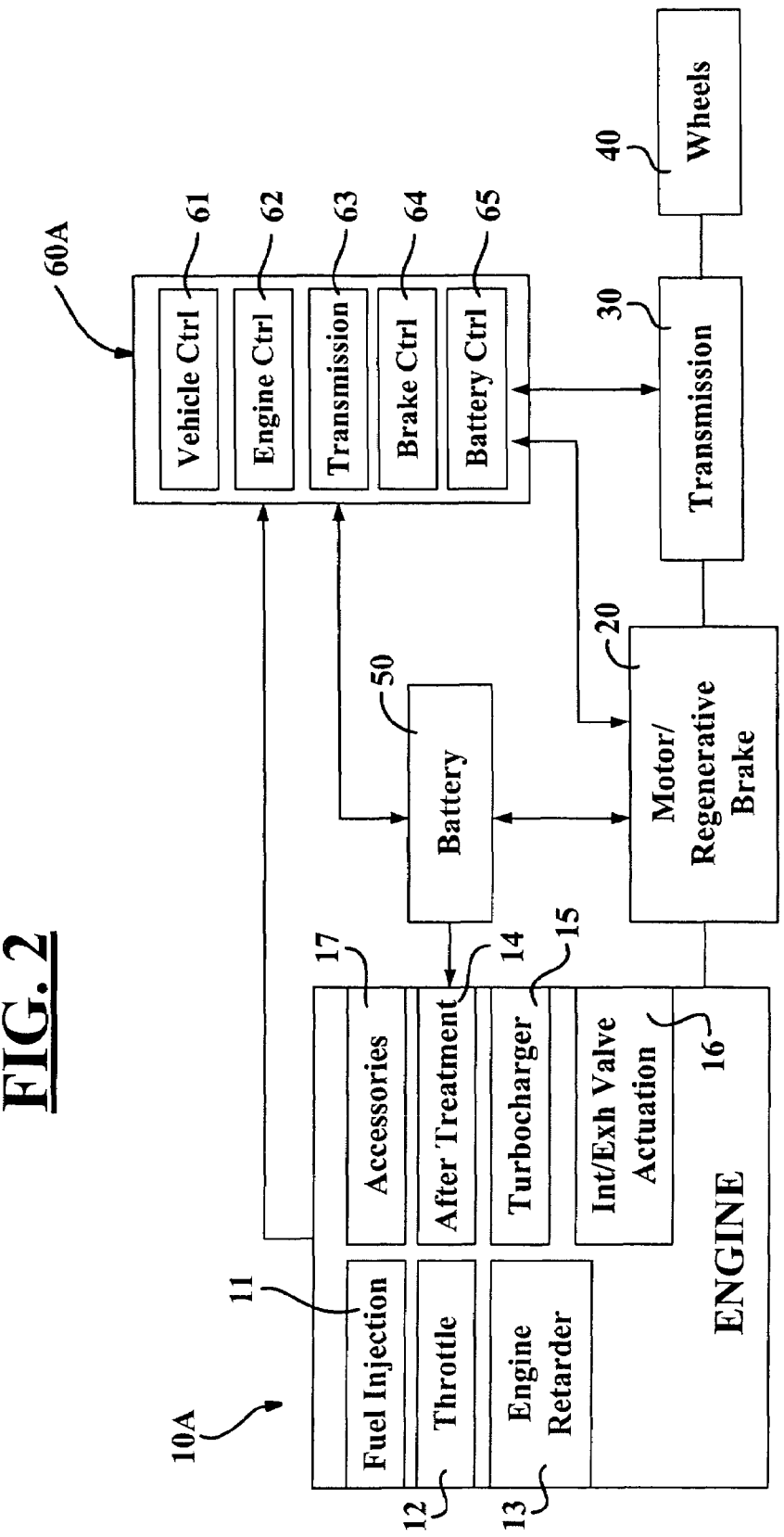
FIG. 2 is a schematic of a hybrid powertrain constructed in accordance with the teachings of the present invention.

Referring to FIG. 2, a drivetrain constructed in accordance with the teachings of the present invention is illustrated to include an integrated internal combustion engine 10A. Engine 10A can include various controllable systems including a fuel injection system 11, a throttle system 12, an engine retrading mechanism 13, an aftertreatment system 14, a turbocharger 15, an intake/exhaust valve actuation system 16 for cylinder cutout and variable valve timing, in addition to power-operated accessories 17. Likewise, the electronic controller or ECU 60A can include several control functions including a vehicle control function 61, an engine control function 62, a transmission control function 63, a motor-generator brake control function 64, and a battery control function 65.

Figure 3:
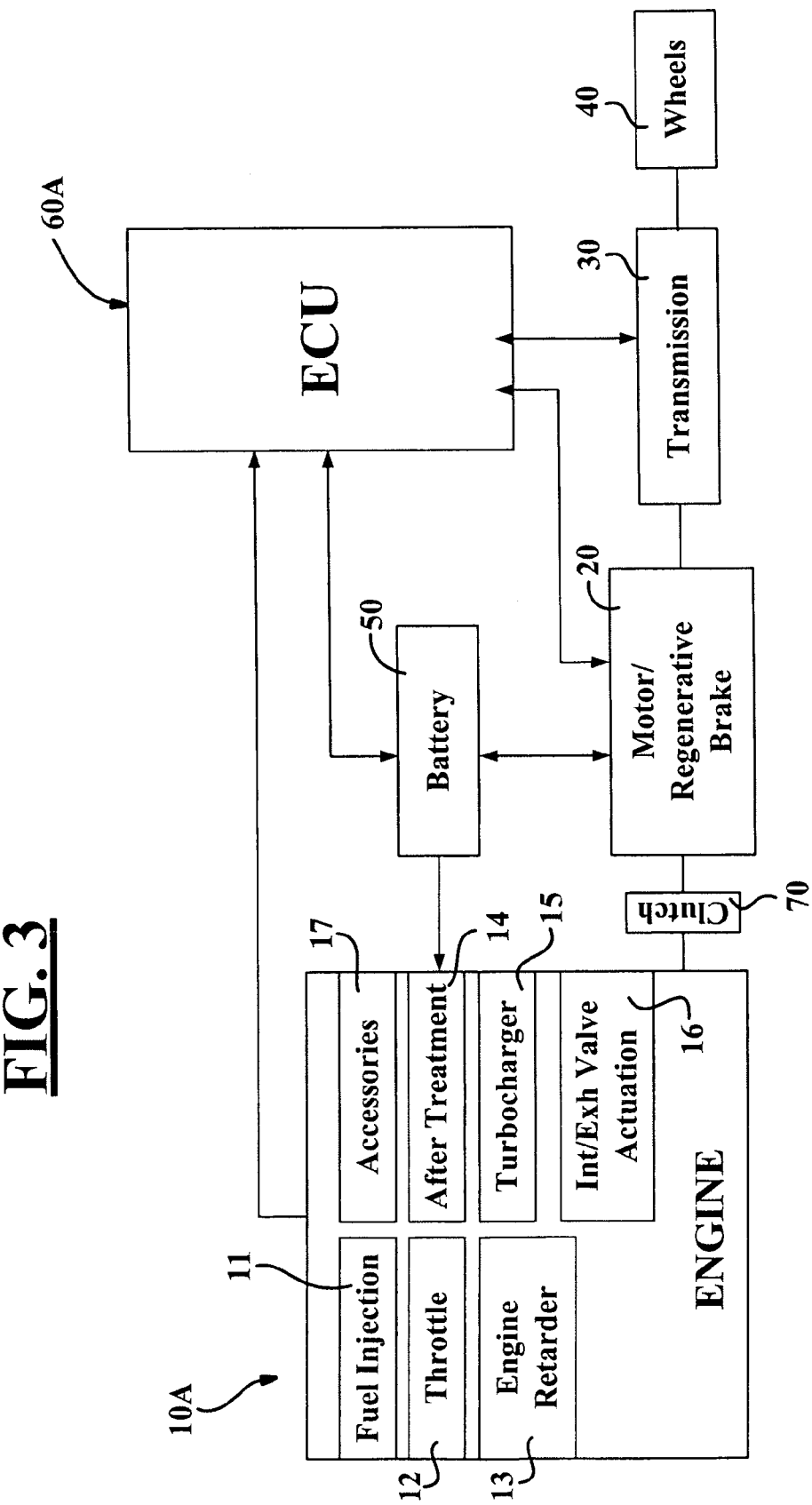
FIG. 3 is a schematic of an alternative hybrid powertrain constructed in accordance with the teachings of the present invention, the hybrid powertrain being equipped with clutch between the engine and the motor/regenerative brake.

FIG. 3 shows an alternative configuration for the integrated internal combustion engine 10A within the hybrid powertrain. Specifically, a clutch device 70 is placed in between internal combustion 10A engine and motor 20.

Figure 4:
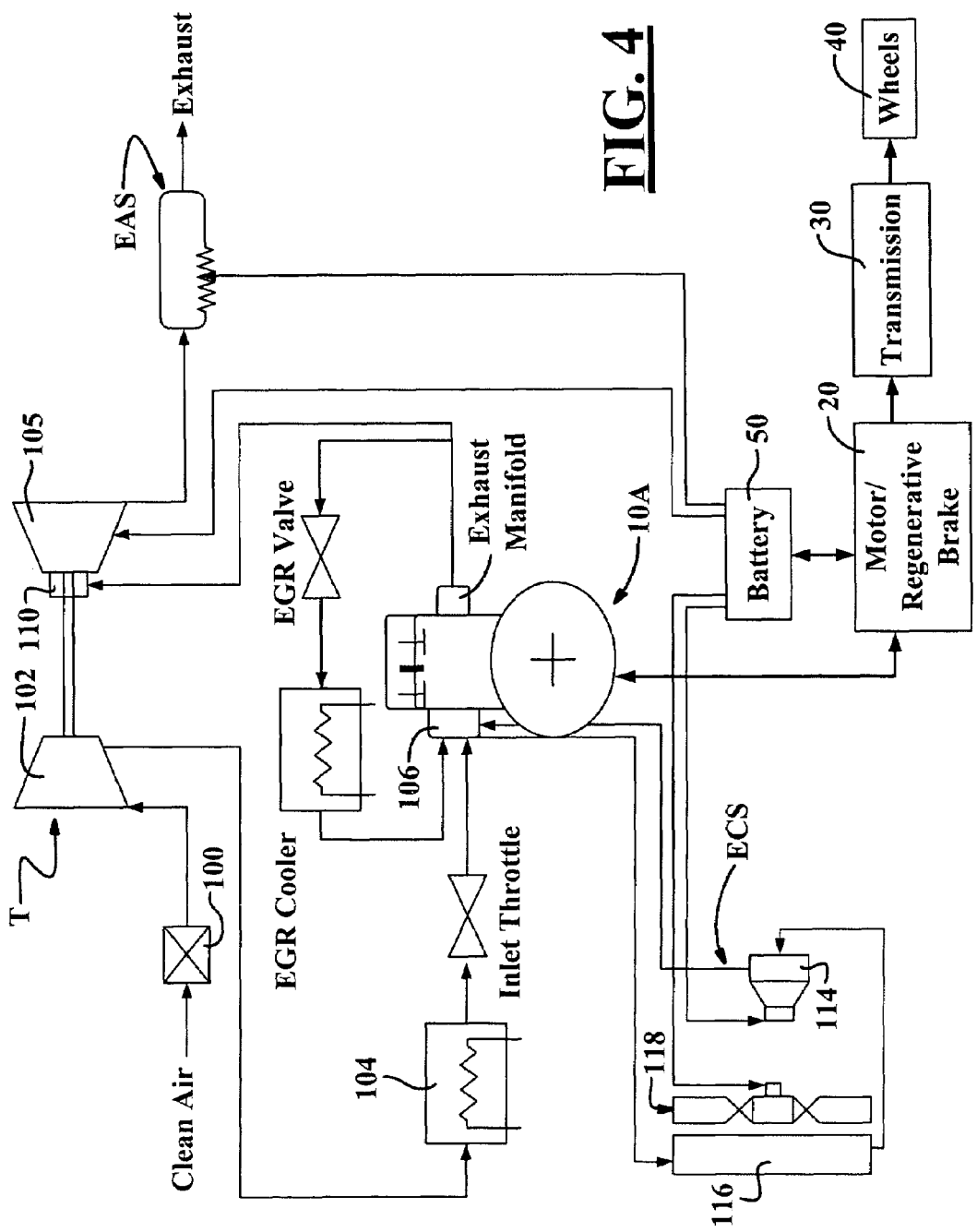
FIG. 4 is a schematic of a portion of the hybrid powertrain of FIG. 2 illustrating the internal combustion engine in greater detail.

FIG. 4 is a schematic illustration of the hybrid powertrain illustrating the engine 10A in greater detail. The engine 10A can include an intake manifold 106, an exhaust manifold EM, an exhaust gas recirculation valve EGRV, an exhaust gas recirculation cooler EGRC, a turbocharger T, an exhaust aftertreatment system EAS, a charge air cooler 104, an inlet manifold throttle IMT, and a coolant system CS. Clean air entering an air intake system passes through an air filter 100 and is directed to the compressor 102 of the turbocharger T. Compressor 102, which is driven by the turbine 105 of the turbocharger T, compresses the incoming air to thereby increase its pressure. The pressurized air can be cooled as it passes through a charge air cooler 104 prior to entering the intake manifold 106.

The energy of the exhaust air is used to drive turbine 105. The turbocharger T can be configured with variable geometric nozzles 108 and/or a high-speed motor 110, which is powered by battery 50 of the hybrid powertrain. The high-speed motor 110 to increase the responsiveness of the turbocharger T at part load operating conditions and during acceleration.

Figure 5:
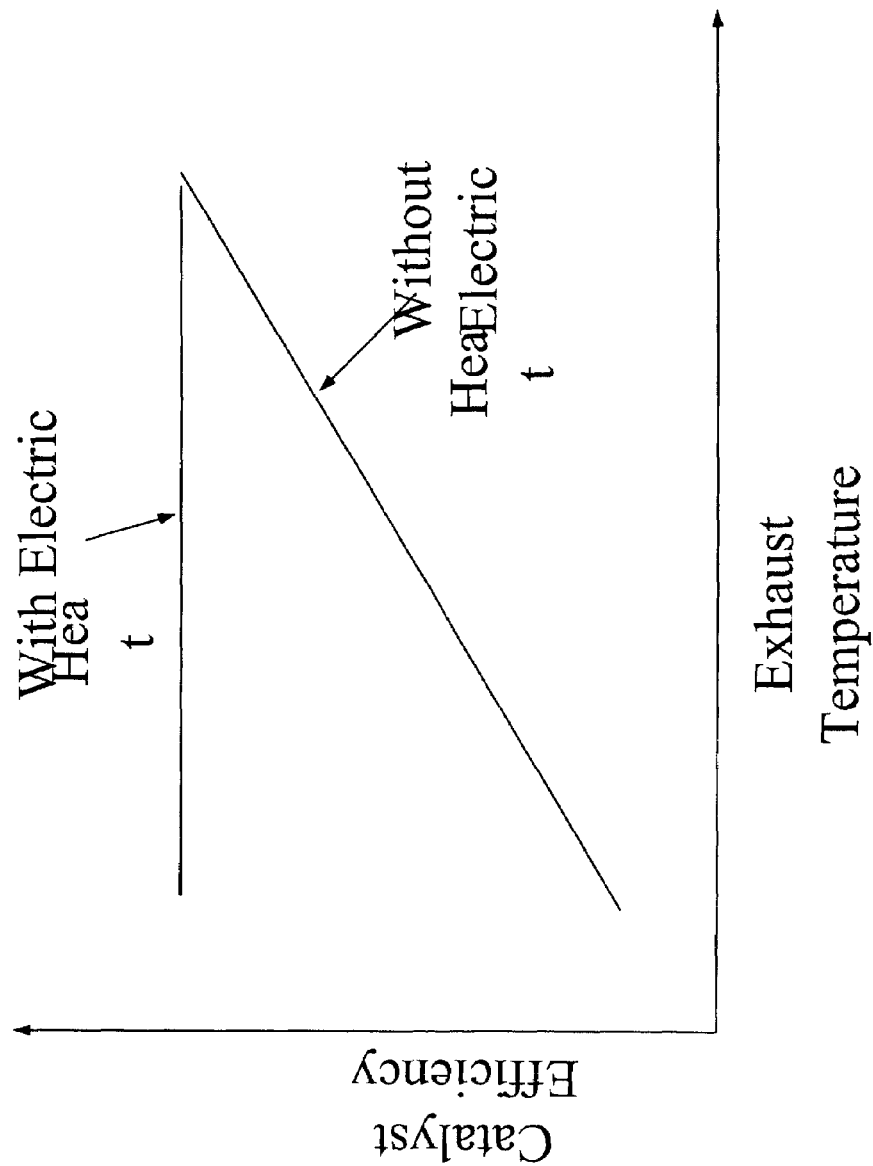
FIG. 5 is a plot illustrating the catalyst conversion efficiency of the hybrid powertrain of FIG. 2 with and without auxiliary heating of the catalyst.

The exhaust aftertreatment system EAS can be employed to reduce the amount or concentration of pollutants in the exhaust gas, such as oxides of nitrogen (NOx) and particulate matter (PM), prior to discharging the exhaust gas to the ambient. The efficiency of the exhaust after treatment system EAS is temperature dependent. At various times the conversion efficiency of the exhaust aftertreatment system can be relatively low due to low exhaust temperature during low speed and/or part load operation and/or start up operation. An electric heater 112 can be used to heat the exhaust after treatment system EAS to a predetermined temperature, such as its optimum conversion temperature, regardless of the engine-operating conditions. Battery 50 of the hybrid powertrain provides the power to electric heater 112. The conversion efficiency comparison of the exhaust aftertreatment system EAS with and without supplemental heat is shown in FIG. 5.

Returning to FIG. 4, the engine coolant system ECS employs a water pump 114 to circulate engine coolant to cool the engine 10A. Hot coolant flows to a radiator 116, which is cooled by a fan 118. Instead of being driven by the engine crankshaft, water pump 114 and cooling fan 118 employ motors that are powered by battery 50 of the hybrid powertrain.

Figure 6:
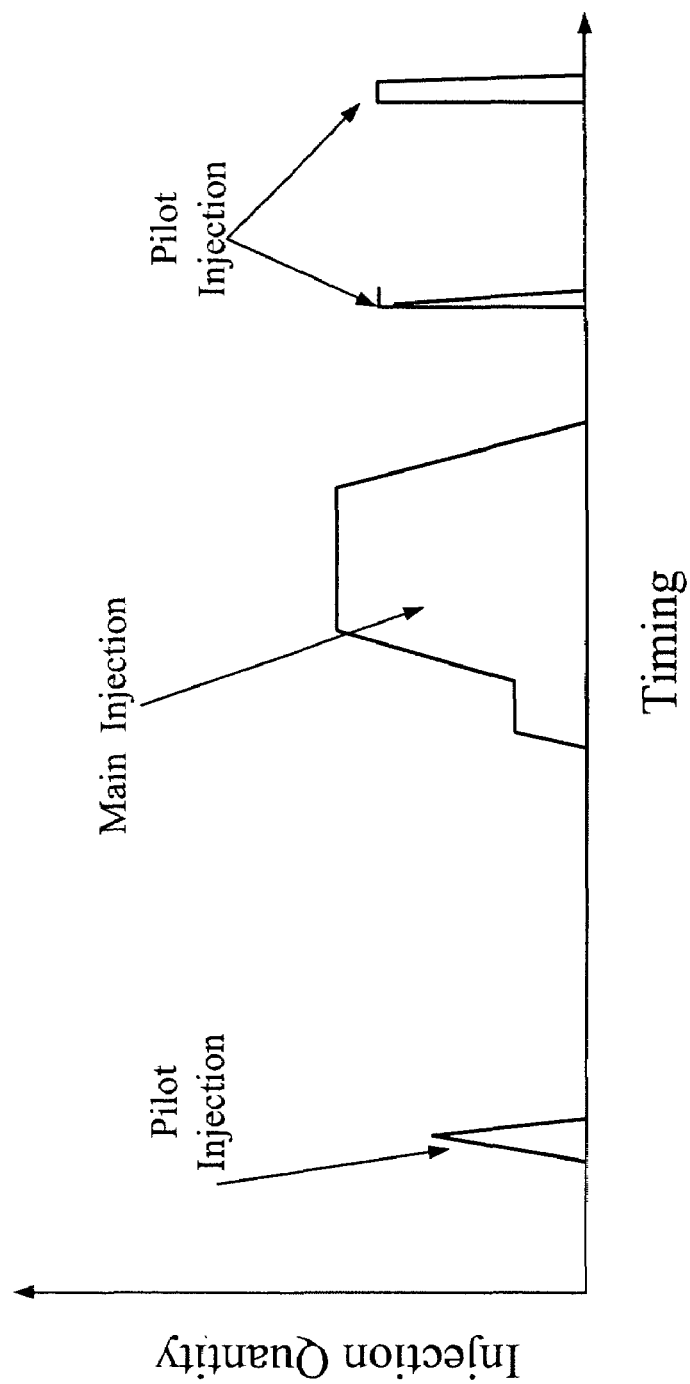
FIG. 6 is a plot illustrating the capabilities of the fuel injection system of the internal combustion engine.

The capability of diesel engine fuel injection system 11 (FIG. 2) is shown in FIG. 6. The fuel injection system 11 (FIG. 2) can include multiple injection and rate shaping capabilities. If employed, a pilot injection event that occurs prior to a main injection event can be employed to reduce combustion noise and NOx emissions. If employed, a first pilot injection event occurring after the main injection event reduces PM emissions with minimum fuel economy penalty, while a second pilot injection event occurring after the main injection and first pilot injection events can provide a source of hydrocarbons that permit the exhaust aftertreatment system EAS (FIG. 4) to reduce NOx emissions.

Figure 7:
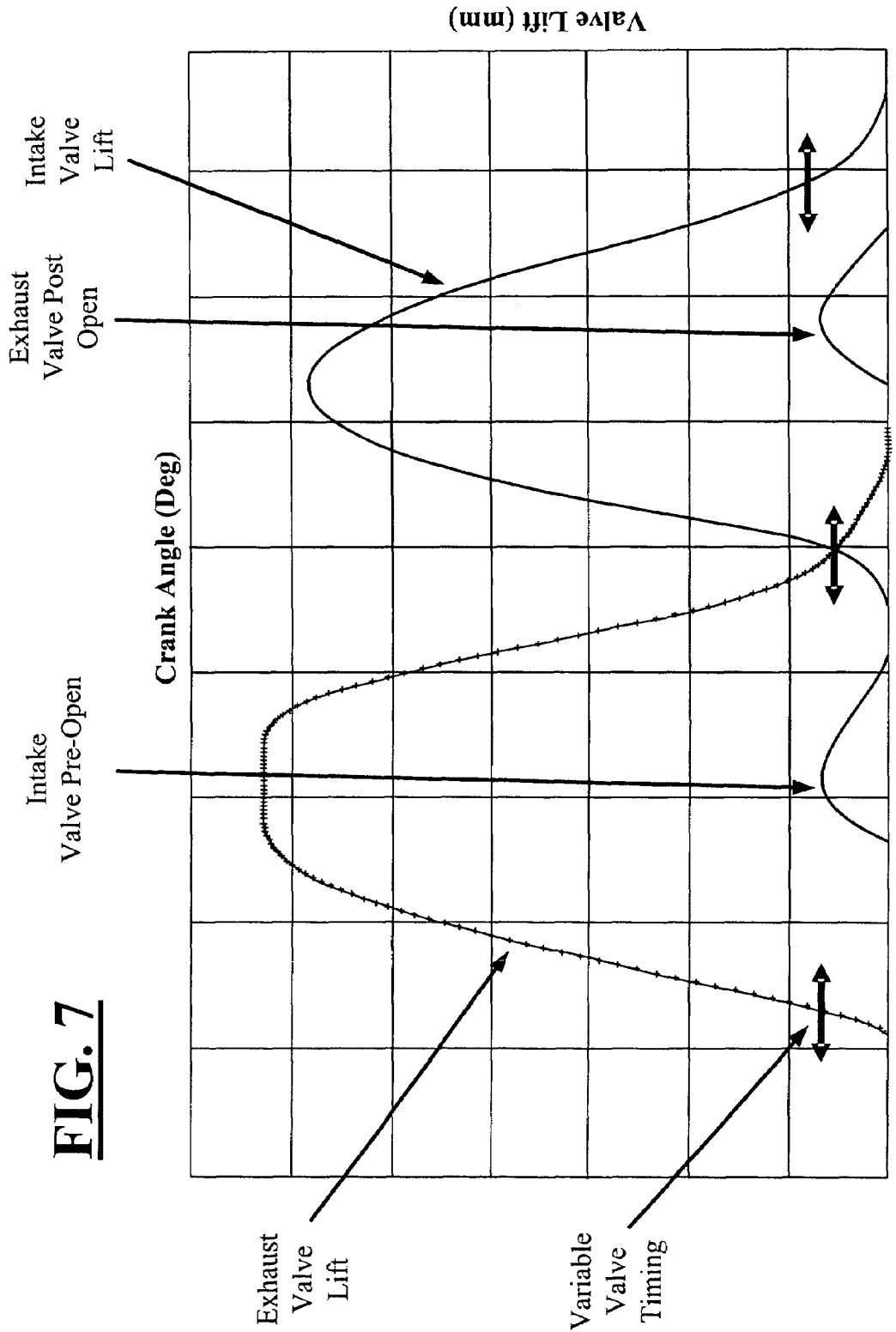
FIG. 7 is a plot illustrating the valve lift of a variable valve actuation system associated with the internal combustion engine.

Returning to FIG. 2, actuators (not shown) associated with valve actuation mechanism 16 provide variable timing capabilities. An exemplary valve lift profile is shown in FIG. 7. The valve actuators can be selectively employed to change the timing with which the intake and exhaust valves can be opened and closed, as well as to selectively reopen the valves. Reopening the intake and exhaust valves can reduce pumping losses as when only the motor/regenerative brake is employed to power the hybrid powertrain. By pre-opening the intake valve during the exhaust stroke, a small portion of the exhaust gas discharges to the intake manifold. This portion of the exhaust gas will be readmitted to the cylinder to mix with fresh air in a manner known as internal exhaust gas recirculation. Generally speaking, exhaust gas recirculation reduces the NOx formation during the combustion process within an engine cylinder. Another exhaust gas recirculation technique is to reopen the exhaust valve during the intake stroke. The exhaust gases will re-enter an engine cylinder from the exhaust manifold to the cylinder due to the relatively high pressure of the exhaust gases in the exhaust manifold.

In combination of the diesel engine's injection capabilities and the valve actuation capabilities, one or more cylinders can be selectively cut out (i.e., not fueled so as to be non-power producing) during part load or the motor only operating modes to maximize the fuel economy.

Figure 8:
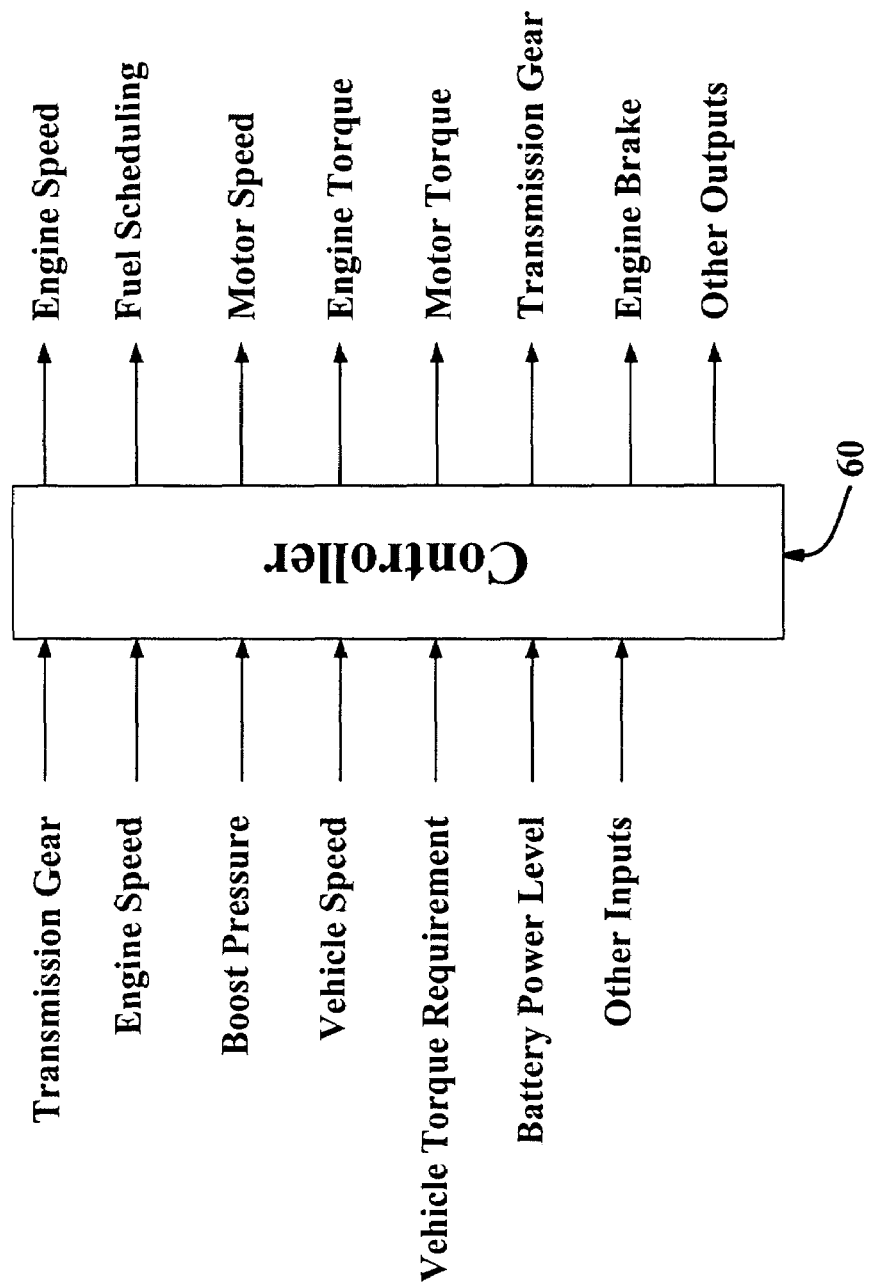
FIG. 8 is a schematic illustration of a portion of the hybrid powertrain of FIG. 2 illustrating the electronic controller in greater detail.

FIG. 8 shows the inputs and outputs of electronic controller 60A. The inputs to the electronic controller 60A (FIG. 2) can include the vehicle torque requirements, vehicle speed, engine speed, engine boost pressure and temperature, battery power level, transmission gear and motor torque level etc. The outputs can include engine speed, torque, engine fueling map, motor torque, transmission gear and retarding power etc.

Figure 9:
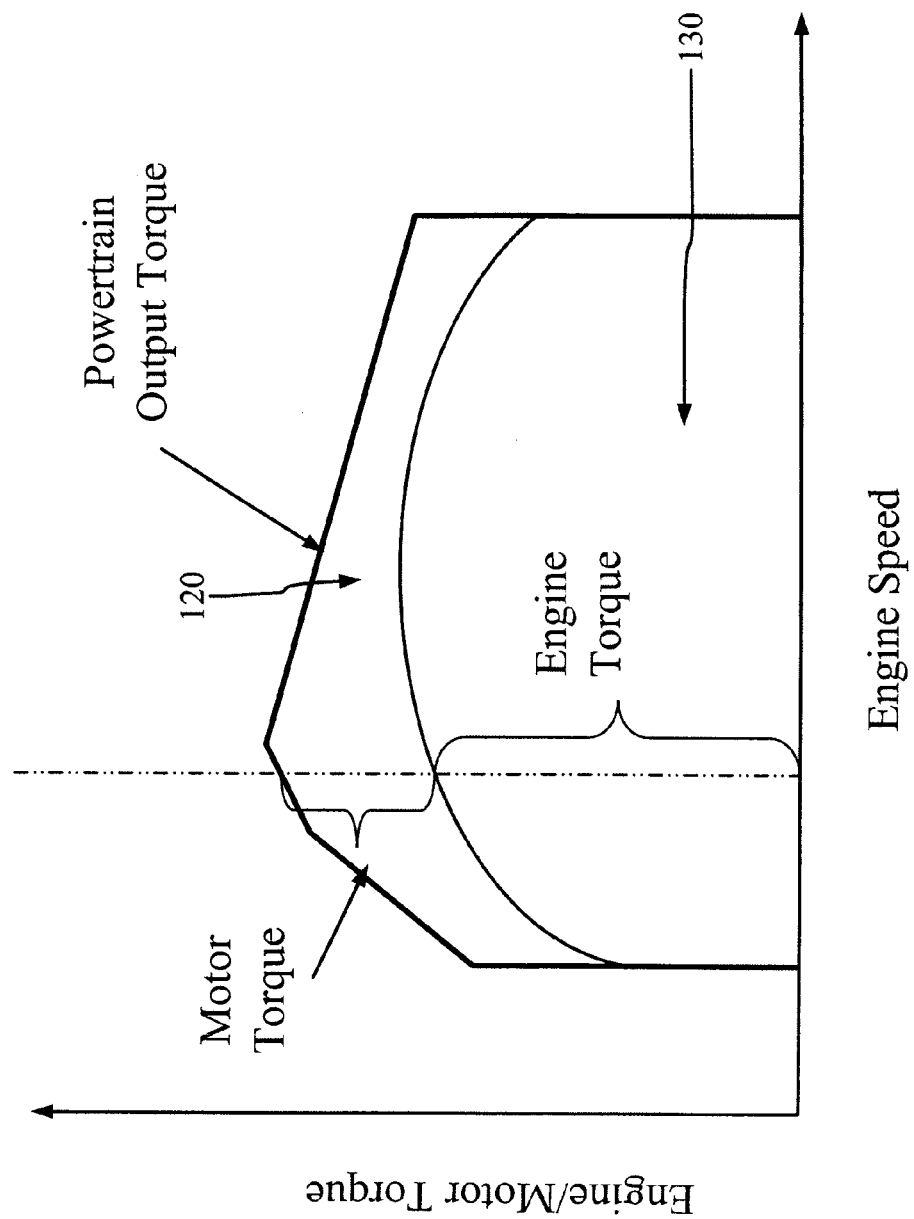
FIG. 9 is an operating diagram of steady state torque map for a hybrid vehicle employing the hybrid powertrain of FIG. 2.

FIG. 9 shows a steady state map of powertrain (i.e. engine+motor) torque as a function of engine speed. The powertrain torque comprises the engine torque output 130 from the diesel engine 10A and the motor torque output 120 from electric motor 20.

Figure 10:
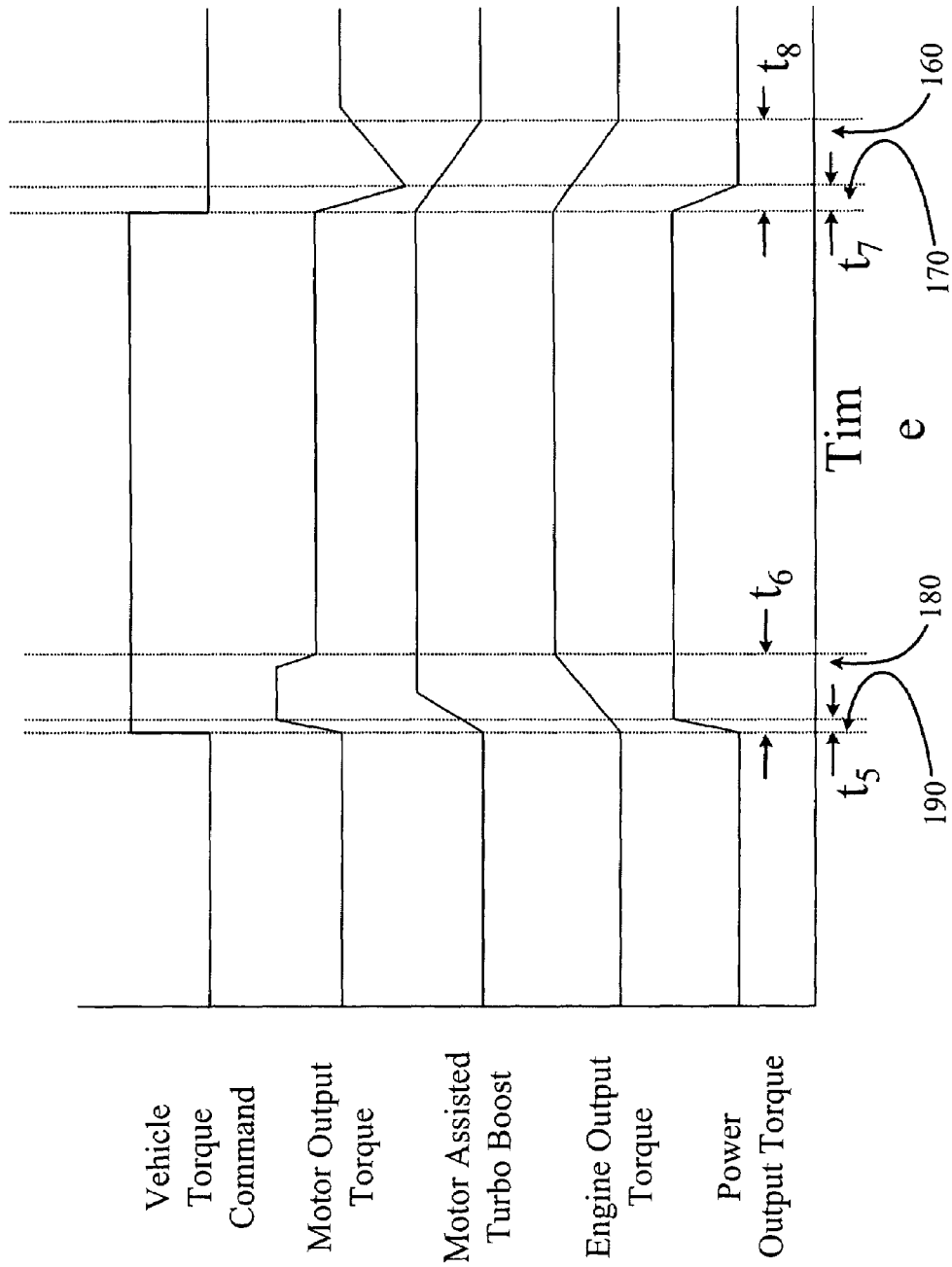
FIG. 10 is an operating diagram illustrating the transient operating control of the hybrid powertrain of FIG. 2 when the motor assisted turbocharger is operated in accordance with the teachings of the present invention.

FIG. 10 shows time sequences for the hybrid powertrain's is transient responses. Plot 150 shows a torque command of a vehicle. The torque command increases torque demand at time $t_1$ and decreases at time $t_5$. A plot 160 of the output torque of the motor/regenerative brake 20 (FIG. 2) illustrates that the output torque of the motor/regenerative brake 20 reaches its maximum value at time $t_2$. A plot 170 of the output torque of the engine 10A (FIG. 2) illustrates that the output torque of the engine 10A reaches a specific value at time $t_4$. The plot 180 illustrates that the output torque of the hybrid powertrain (i.e. the combined torque of the motor/regenerative brake 20 and the engine 10A) reaches a specified value at time $t_3$, which has shorter response time than the engine 10A alone. The plots 150 through 180 also illustrate that the hybrid powertrain has a relatively fast response when the command torque is decreased.

Figure 11:
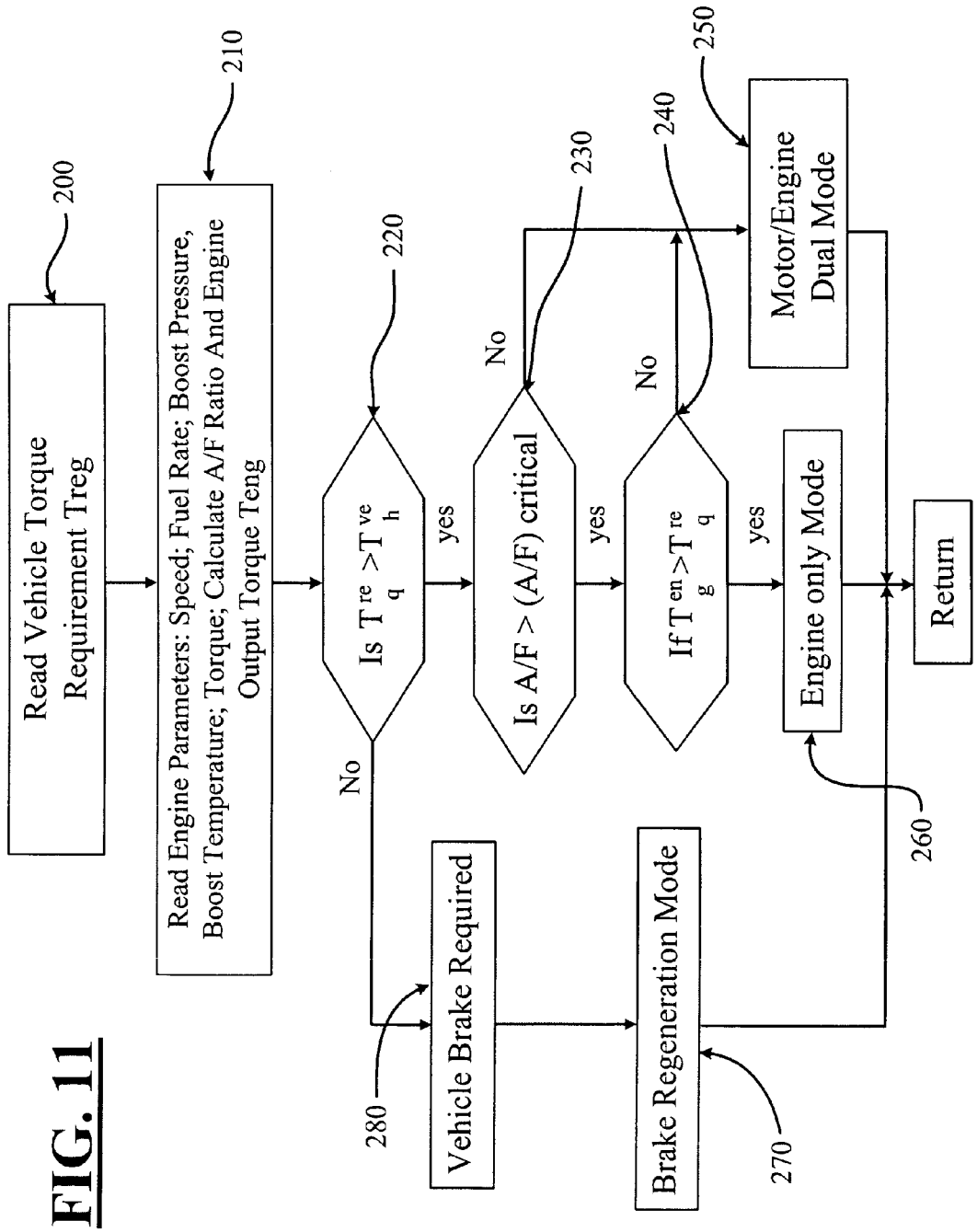
FIG. 11 is a schematic illustration in flow chart form of a control strategy for a heavy-duty hybrid vehicle performed in accordance with the teachings of the present invention.

FIG. 11 is a flowchart showing a control strategy for a hybrid powertrain in accordance with the teachings of the present invention. The methodology begins at block 210 where the ECU 60A (FIG. 2), which receives vehicle data such as vehicle speed, fuel injection rate, boost pressure, temperature, etc. and determines a vehicle torque requirement (Treq) and a vehicle operating torque (Tveh). In block 220, the methodology determines an engine torque output (Teng) of the engine 10A (FIG. 2). In block 230, the methodology compares the vehicle operating torque $T_{veh}$ and the vehicle torque requirement $T_{req}$. If $T_{req}$ is not greater than $T_{veh}$, the methodology proceeds to block 280 and vehicle braking can be employed, as shown in block 270, to reduce the torque output of the powertrain such that the vehicle operating torque Tveh is equal to the vehicle command torque Treq. Returning to block 230, if the required torque $T_{req}$ is greater than $T_{veh}$, then the methodology proceeds to block 240. In block 240, if the engine torque $T_{eng}$ is not greater than $T_{req}$, the hybrid powertrain will operate in a dual engine/motor operating mode as illustrated at block 250. The methodology will then loop back to block 210 as indicated by the block labeled "return". Returning to block 240, if the engine torque Teng is greater than the vehicle torque command Treq, the methodology will proceed to block 260 and the hybrid powertrain will operate in an engine only mode.

FIG. 12A illustrates a powertrain regenerating brake control methodology for a hybrid powertrain in accordance with the teachings of the present invention. The methodology begins at block 310 where the ECU 60A, which receives vehicle data such as vehicle speed, fuel injection rate, boost pressure, temperature, etc., and determines a vehicle torque requirement (Treq). The methodology proceeds to block 320 where a deceleration torque requirement (Tbrake) (which may be based on vehicle speed and other vehicle operating parameters, engine brake torque and/or the motor brake torque) is determined. The methodology determines in block 330 whether the deceleration torque requirement Tbrake is greater than the vehicle torque requirement Treq. If the deceleration torque requirement Tbrake is not greater than the vehicle torque requirement Treq, then engine braking will be activated in combination with the motor regenerating brake, as illustrated at block 340. The methodology will proceed to block 350 to determine whether the amount of noise that is produced by engine braking is relatively higher than desired (e.g., exceeds a level that complies with local noise regulations). If the engine braking noise level exceeds a noise threshold level in block 350, the methodology proceeds to block 360 where the engine valve timing is varied to reduce the noise that is produced by engine braking. The methodology can loop back to block 350. If the engine braking noise level does not exceeds the noise threshold in block 350, the methodology loops back to block 310 as is indicated by the block labeled "return". Returning to block 330, if the deceleration torque requirement Tbrake is greater than the vehicle torque requirement Treq, the methodology will cause the hybrid powertrain to operate in a regenerating brake only mode at stop as is illustrated in block 370. The methodology can then loop back to block 310 as is indicated by the block labeled "return".

Figure 12B:
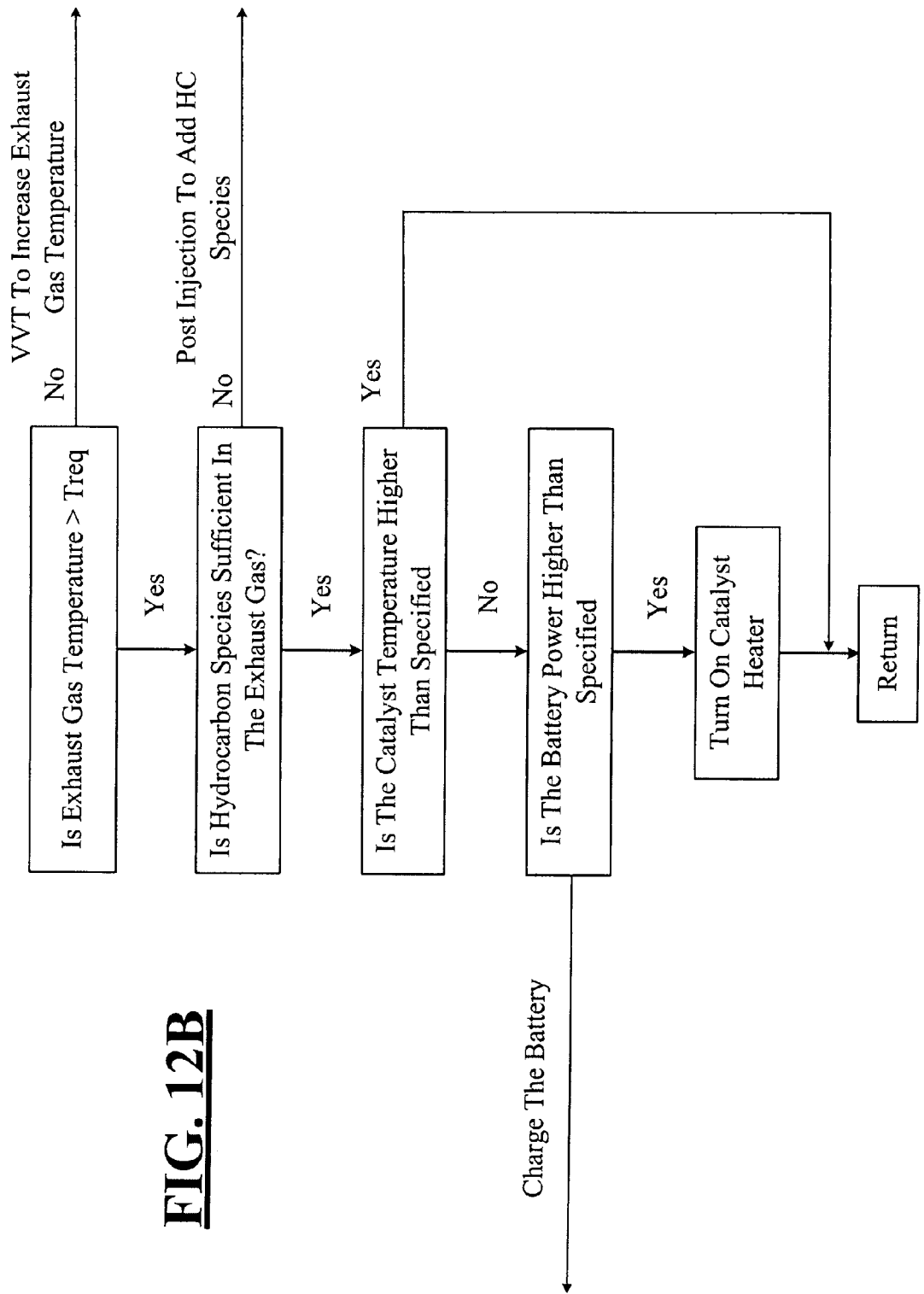
FIG. 12B is a schematic illustration in flow chart form illustrating a method for treating exhaust emissions from a hybrid vehicle in accordance with the teachings of the present invention.

FIG. 12B illustrates a methodology in accordance with the teachings of the present invention for controlling an exhaust aftertreatment system (e.g., a catalyst temperature) to improve the effectiveness of the exhaust aftertreatment system in some situations. The methodology begins at block 400 where various vehicle parameters of the engine are determined. In block 430, the methodology compares the exhaust gas temperature with a predetermined temperature threshold, which may be indicative of a temperature required for effective catalyst operation. If the exhaust gas temperature is not greater than the required temperature (Treq), the exhaust valve timing can be adjusted through a variable valve actuation (VVA) device in block 410 to increase the temperature of the exhaust gases. The methodology can loop back to block 430. If the exhaust gas temperature is greater than the required temperature Treq in block 430, the methodology proceeds to block 440 where the methodology determines whether the exhaust gas has an appropriate hydrocarbon concentration. If the hydrocarbon concentration is lower than a predetermined concentration, the methodology proceeds to block 420 where post injection (i.e., a pilot injection event occurring subsequent to a main fuel injection event) or auxiliary exhaust manifold injection is performed to add hydrocarbons into the exhaust gas stream. The methodology can loop back to block 440. If the hydrocarbon concentration is not lower than the predetermined concentration in block 440, the methodology proceeds to block 450 where a temperature of a catalyst in the exhaust aftertreatment system is determined. If the temperature of the catalyst is not higher than a predetermined temperature, the methodology proceeds to block 460 where a battery powered catalyst heater is activated to provide a supplemental amount of heat to increase the temperature of the catalyst as is illustrated in block 460. The methodology can loop back to block 450. If the temperature of the catalyst is higher than the predetermined temperature, the methodology can loop back to block 400 as is indicated by the block labeled "return".

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A vehicle comprising:
    a diesel engine with a plurality of intake valves, a plurality of exhaust valves and an exhaust after treatment system having an electric heater;
    a motor/regenerative brake coupled to the diesel engine;
    a transmission coupled to the diesel engine and the motor/regenerative brake;
    at least one electrically powered engine component selected from a group consisting of a motor-assisted turbocharger, a cooling fan, a water pump, an engine decompression device, and an engine exhaust brake;
    a battery coupled to the motor/regenerative brake, the electric heater and the at least one electrically powered engine component; and
    a controller coupled to the battery, the motor/regenerative brake, the electric heater and the at least one electrically powered engine component, the controller selectively controlling power from the battery to the electric heater to heat the after treatment system to a predetermined temperature prior to operating the diesel engine, the controller further controlling power from the battery to operate at least one electrically powered engine component, the controller being configured to selectively operate the motor/regenerative brake in a braking mode and to operate the engine brake if a deceleration torque is greater than a braking torque provided by the motor/regenerative brake;
    wherein the diesel engine, the motor/regenerative brake and the transmission at least partially form a hybrid power train and wherein the controller is operable for selectively operating the hybrid powertrain in one of a first mode in which only the diesel engine provides rotary power to the transmission, a second mode in which both the diesel engine and the motor/regenerative brake provide rotary power to the transmission, and a third mode in which only the motor/regenerative brake provides rotary power to the transmission;
    wherein during operation of the hybrid powertrain in the third mode, at least a portion of the intake valve, the exhaust valves or both the intake and exhaust valves are opened to reduce pumping losses.

* * * * *